US008185596B2

(12) United States Patent
Toledano et al.

(10) Patent No.: US 8,185,596 B2
(45) Date of Patent: May 22, 2012

(54) LOCATION-BASED COMMUNICATION METHOD AND SYSTEM

(75) Inventors: Eyal Toledano, Kiryat Ata (IL); Orna Bregman-Amitai, Tel-Aviv (IL); Amir Shaham, Givat Shmuel (IL); Eduard Oks, Bat-Yam (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 195 days.

(21) Appl. No.: 12/709,612

(22) Filed: Feb. 22, 2010

(65) Prior Publication Data

US 2011/0208817 A1     Aug. 25, 2011

(51) Int. Cl.
*G06F 15/16* (2006.01)
(52) U.S. Cl. ........................................ 709/206; 709/217
(58) Field of Classification Search .......... 709/204–207, 709/217–219
See application file for complete search history.

(56) References Cited

U.S. PATENT DOCUMENTS

| 6,504,956 | B1 * | 1/2003 | Gannage et al. | 382/188 |
|---|---|---|---|---|
| 2007/0024527 | A1 | 2/2007 | Heikkinen | |
| 2007/0032244 | A1 | 2/2007 | Counts | |
| 2008/0122871 | A1 | 5/2008 | Guday | |
| 2008/0147730 | A1 | 6/2008 | Lee | |
| 2009/0081959 | A1 | 3/2009 | Gyorfi et al. | |
| 2009/0096875 | A1 | 4/2009 | Yoshimaru | |
| 2009/0248300 | A1 | 10/2009 | Dunko | |
| 2009/0292464 | A1 | 11/2009 | Fuchs | |
| 2009/0327433 | A1 * | 12/2009 | Comertoglu et al. | 709/206 |
| 2010/0017759 | A1 * | 1/2010 | Birnbaum et al. | 715/863 |
| 2010/0023878 | A1 * | 1/2010 | Douris et al. | 715/757 |
| 2010/0039505 | A1 | 2/2010 | Inoue | |
| 2010/0045619 | A1 * | 2/2010 | Birnbaum et al. | 345/173 |

FOREIGN PATENT DOCUMENTS

EP    1 734 341    12/2006

* cited by examiner

*Primary Examiner* — Faruk Hamza
(74) *Attorney, Agent, or Firm* — Roach Brown McCarthy & Gruber, P.C.; Kevin D. McCarthy

(57) ABSTRACT

A method for providing location-based messages comprises locating a suitable placeholder for a message within a physical surrounding using a handheld device provided with image acquisition apparatus, and associating a written or visual or audio message, or a combination of two or more of them, with an image that identifies said placeholder, said association being carried out in a server adapted to communicate with said handheld device.

15 Claims, 3 Drawing Sheets

LOCATION-BASED COMMUNICATION METHOD AND SYSTEM

FIELD OF THE INVENTION

The present invention relates to a novel communication method and system implementing it. More particularly the invention relates to a method for creating placeholders for notes to be left by, and read by, users of handheld communication apparatus provided with imaging means, such as a camera.

BACKGROUND OF THE INVENTION

Handheld portable devices, such as cellular phones, are widely used for direct communication between users, but their utility in off-line communication as of today is limited. Although it would be highly desirable to be able to "leave messages" in various locations, which can be read by authorized users, without the need to encode messages to a specific user at a specific time, the art has so far failed to provide a simple and convenient way to do so. Attempts have been made in the art, based on GPS or QR codes, but these have not resulted in widely usable and practically convenient solutions to this problem.

For example, US2009/0081959 titled "Mobile Virtual and Augmented Reality System", presents a method for creating a "virtual graffiti", allocating it to a specific geographical location, or object, uploading it to a server and allowing authorized viewers to download the graffiti when they are in geographical proximity. The invention uses GPS for geographic positioning or alternatively if the GPS fails to operate it suggests a Wi-Fi based indoor location system. Practically however this reference does not refer to the limitations of the use of the mobile phone. It does not enable direct transferring of information between users and does not take into account the resource limits that characterize the use of a mobile phone.

A further example is US2008/0122871, titled "Federated Virtual Graffiti". Again this is an example that enables associating virtual messages based on geographic locations and restricting access to particular users. However this system requires the usage of a specific virtual board, in order to overcome the resources limitations of the mobile phone in locating the messages left. Thus, this application as well as the '959 patent application do not offer a comprehensive solution, which specifically tackles the mobile phone limitations.

Accordingly, it is an object of the present invention to provide a method and a system suitable to implement it which overcomes the problems of the prior art and permit users to exchange location-based messages in a simple and convenient way, using readily available devices, such as cellular phones.

Other objects and advantages of the invention will become apparent as the description proceeds.

SUMMARY OF THE INVENTION

The invention relates to a method for providing location-based messages, comprising locating a suitable placeholder for a message within a physical surrounding using a handheld device provided with image acquisition apparatus, and associating a written or visual or audio message, or a combination of two or more of them, with an image that identifies said placeholder, said association being carried out in a server adapted to communicate with said handheld device.

According to one embodiment of the invention the method further comprises identifying a message placeholder using image acquisition apparatus provided in a handheld device, communicating with a server in which one or more messages are associated with said message placeholder, and retrieving said one or more messages therefrom.

The invention is also directed to a system for managing location-based messages, comprising:
a database suitable to associate one or more messages with one or more images that identify message placeholders;
computing means suitable to manage inputs and outputs of data and computing means suitable to locate and forward messages associated with a specific message placeholder; and
communication apparatus suitable to receive data representative of message placeholders and of messages associated therewith from a handheld device, and to transmit data representative of a message to a handheld device.

DETAILED DESCRIPTION OF THE INVENTION

The invention enables the creation of augmented messages on both indoor and outdoor surfaces. The invention enables the sharing of the content created using a server/PC or directly using MMS between devices. As will be further explained below, the invention is especially designed to suit mobile phones and therefore uses the phone's resources in an efficient manner. Furthermore, the invention enables the creation and/or augmentation of virtual objects, which can be sent and received as augmented messages.

The different stages of the process performed according to the invention will be further described below.

Stage 1—Choosing an Object

User "A" points the mobile phone's camera, while in preview mode, looking for a potential object to add to a virtual note. The potential object is picked by an algorithmic engine based on the process that is described below, and is then marked for the user's reference.

As will be apparent to the skilled person, not every object is suitable for the purpose of the invention. It must be a distinguishable object, which can be visually isolated from the environment. Furthermore, the object must contain salient textural features or other information that provides it with attributes that enable unambiguous identification among the plurality of objects that surround it. The detection stages, in which certain candidate objects in the real world are detected, selected and uniquely described, are part of the invention. The selection of a proper subset of the world objects also significantly reduces the resources used by the phone for the objects recognition.

Other than the requirement that the object is unambiguously identified, there is no limitation on the nature of the object that can be used in conjunction with the invention. The types of filtered objects (to which notes may be assigned) may vary in different applications.

Figure 1:
FIG. 1 is an example of valid object detection by a user.
Figure 2:
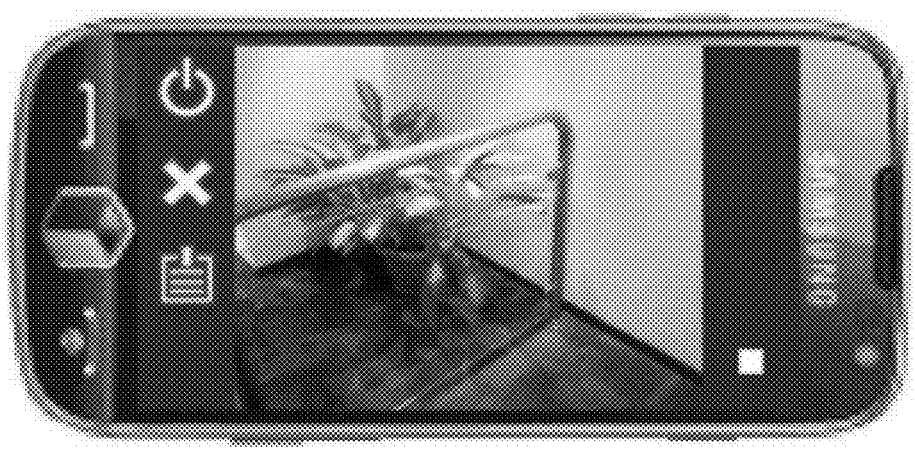
FIG. 2 is an example of an invalid object that is filtered out.
Figure 3:
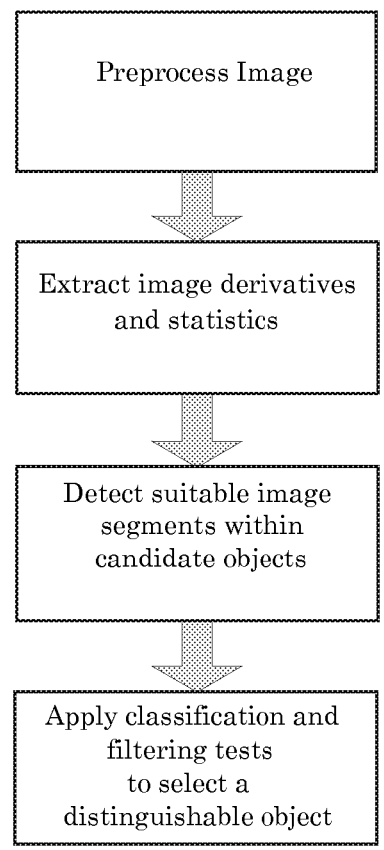
FIG. 3 schematically illustrates a detection algorithm according to one embodiment of the invention.

The following example will further illustrate this stage of the invention. FIGS. 1 and 2 show an example of object detection. In this example object detection and note assignment are limited to planar objects on walls like signs and pictures, other world objects are filtered out. FIG. 1 illustrates the valid depiction of a planar object (in this example a picture), which is framed by a thin frame, which indicates to the user that the object has been selected. An example of the process is described in FIG. 3 and FIG. 4 and is further detailed below. FIG. 2, in contrast, shows a three-dimensional object, which according to the definition given by the engine in this particular example is an invalid object type, and is therefore not selected in the process.

As will be apparent to the skilled person, the invention is not limited to any specific detection algorithm and can function with any suitable detection method. The detection algorithm according to one suitable embodiment of the invention follows the stages illustrated in FIG. 3. Said stages comprise pre-processing the image, extracting image derivatives and statistics, detecting within one or more candidate objects image segments suitable to carry out the process, and then applying classification and filtering tests to obtain from among those candidates an object that is suitable for recognition.

The preprocessing of the image includes converting the image to workable format and size and applying required image filtering algorithms, e.g., to smooth enhance or denoise the image. Low level image information is collected including various image derivatives (e.g., gradient) and additional statistics to provide inputs for next stages. Next, a segmentation algorithm finds candidate image segments (e.g., region of high gradient and textural features content with desirable shape properties). Finally validation tests are applied to verify that the chosen segments comply with required shape and size, image frame location and sufficient textural information constrains. In this way the matching algorithm is limited to a desired pre-defined part of the world scene, reducing potential processing in next stages. A planarity check of the object is verified when the object is finally matched to a database object, this is further discussed in the description of FIG. 4 below.

For instance, in the example in which planar picture objects are detected, as in FIG. 1, the image is preprocessed for color gradient information. The image of the gradients is then segmented using fast hierarchical projections of image sub-regions on image axes. In this process gradient image content is projected on two orthogonal axes and then the two projected functions are analyzed for candidate 2D regions. This process can be applied to several axes systems and relevant sub-regions can be, hierarchically, further analyzed by their projections. In this way regions with high gradient content can be identified with a fast process which, due to the embedded integration, is robust to image local artifacts. Features that are analyzed in this respect are related to the object itself and are aimed at determining its suitability and ease of identification. Regions that comply with several repeatability, size, shape, statistics and feature content classification tests are defined as valid candidates. For example, in a particular illustrative implementation the detection was restricted to a single candidate region near the image center with minimal and maximal size and with shape constrains. In addition repeatability was verified by tracking the region temporally for several image frames and its textural image data was verified to be sufficient for effective image match process.

Once an object is chosen it is marked and added to a database. The object is identified using two kinds of attributes:

The first type of attributes is related to the location characteristics of the object (e.g., geographic location, network by which it is chosen, orientation in respect of the camera, etc). These attributes allow filtering of a relative small subset of objects from the database for comparison, thus accelerating the search in database and candidate object comparison.

Figure 4:
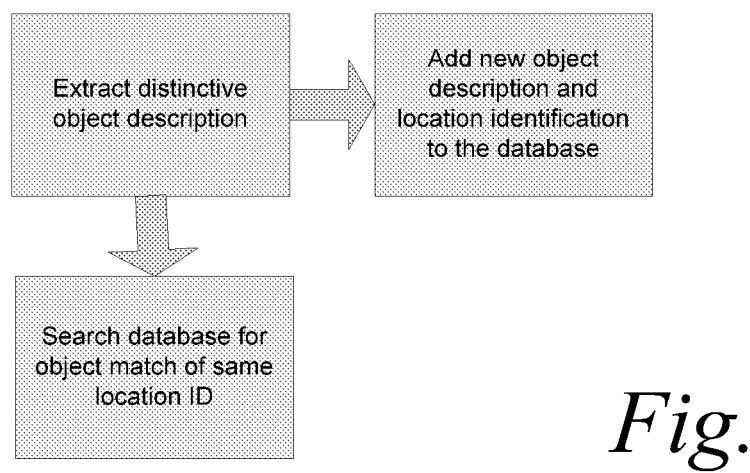
FIG. 4 schematically illustrates the object description taking place during the detection process.

The second type of attributes is the specific object a distinctive description, based on extracted features and image statistics from object views. The complete description enables distinctive and repeatable identification of the object as well as an efficient database search, as schematically illustrated in FIG. 4.

The feature match also provides means for additional checks, such as the object planarity check that was referred to above. Based on the match, it is verified that the transformation of world object points to the camera image points complies with a plane to plane projection.

Object as an Address

An object can now be defined as an address. The unique identification created according to the invention enables the sending and receiving of virtual messages to and from the object (as opposed to sending and receiving messages to and from people). This can be done without the need of being proximate to the object. Thus, once an object that exists in the real world receives an electronic ID and is added to a database it becomes an address which can send and receive messages (of course, through the action of a user provided with a device operating according to the invention).

In addition, communication among people is enhanced with an additional context from the real world. The numerous combinations of user senders, receivers and places (objects) enrich the ways in which communication among users can be done.

Stage 2—Attaching a Virtual Message to the Image

Figure 5:
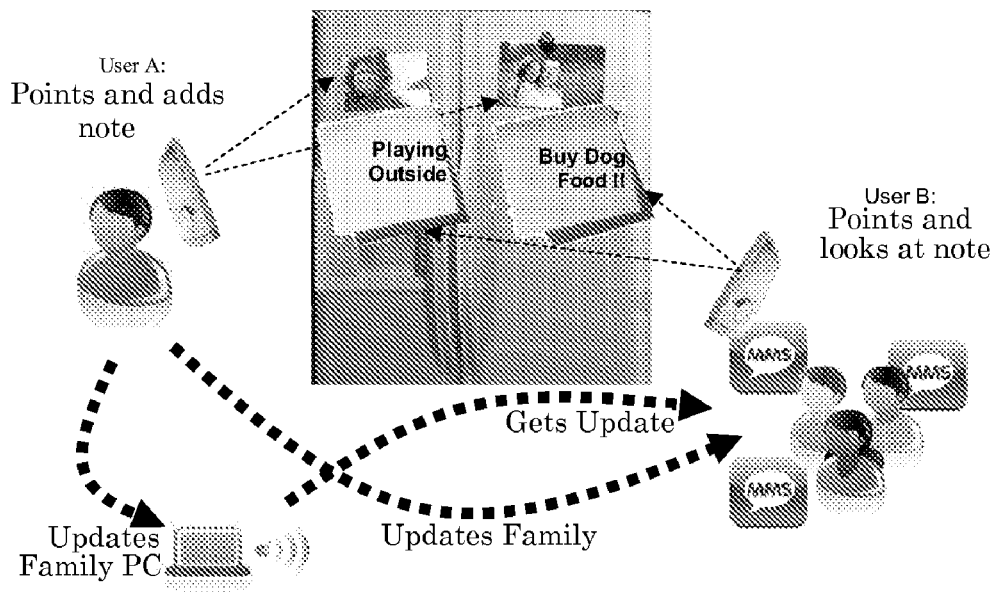
FIG. 5 is an example of use of the invention.

In this stage User "A" selects one object among the valid candidates using the mobile phone (or other portable device) GUI (as illustrated in FIG. 1). Now the user may add/attach a new virtual note to it. This process is schematically illustrated in FIG. 5. The virtual note can contain text, drawings, the attachment of files (audio, video), etc. The user virtually attaches the note to the object, and then the note is tagged and stored in a database.

In one embodiment of the invention, object notes are stored in a shared database. The sharing of an object containing the note can be done in a variety of ways, for instance using a server or MMS. A user may also choose to leave himself/herself a virtual message. Moreover, to simplify the note's content creation, a note template content creation tool can be provided.

Stage 3—Note Detection

In this stage User "B" uses the mobile phone's camera in the preview mode to search and detect potential objects (similarly to the process that is carried out in Stage 1). In certain applications it may be expedient to target specific objects known to all users of the system. As in such cases the potential objects are predefined, the search focuses only on them.

As described above, the invention operates a filtering mechanism, which defines potential objects and an engine then searches and identifies the potential objects (for example rectangular surfaces). The usage of this filtering stage achieves the following benefits:

First, the selective detection reduces the world information that has to be processed. This allows a system of limited computing resources (CPU and memory), such as a mobile phone and other hand-held devices, to handle the recognition task. Secondly, the candidate objects provide sufficient image information to enable feasible object recognition based on their image features, thus enabling robust recognition with low mismatch and high detection probabilities.

Upon the identification of a potential object the engine checks within a database whether the current object exists in the database, and if so, if any note was virtually left on it. The database includes world objects or places, each of which can be related to users notes and additional data. The search in this database is aided using the various attribute keys described above. Also, it will check if the user has permission to receive or see the note, thus enabling discrete communication of many users groups using the same objects for notes assignment. In other words, if the object selected is in the public domain (for instance, is located in a shopping mall) different groups of people may use it to distribute messages among the members, without the danger of having their messages seen by unauthorized people. In public places it may even be desirable to designate special objects as "message boards", to facilitate the use of the invention.

Additional examples of use are discussed briefly below. The kitchen is a useful place to leave messages for the family and an example of use is schematically shown in FIG. 5. In this example User A points at a first picture on the refrigerator and adds to it a note stating that he is outside, playing. He then points at a second picture on the refrigerator and leaves a second note asking a member of his household to buy dog food. Of course, both notes could have been left on the same picture, but in this case User A may want to use separate placeholders for his notes, either because he wants different members of his household to pay more attention to different notes, or for any other reason. In this particular example the family PC is used as the server that operates the invention. Accordingly, the notes left by User A are updated to the PC. If desired, an update can be sent immediately to selected members of the family, e.g. via MMS or e-mail. Alternatively, the other members of the family will only become aware of the messages (or of one or more of them, if some of them have been immediately relayed) when they come into the kitchen and point at the placeholder, which is in this example a picture or part of the picture attached to the refrigerator.

User B, who has not received the message otherwise walks into the kitchen, points his device at the pictures on the refrigerator, discovers that one or more messages have been left and retrieves it by communicating with the home PC.

Figure 6:
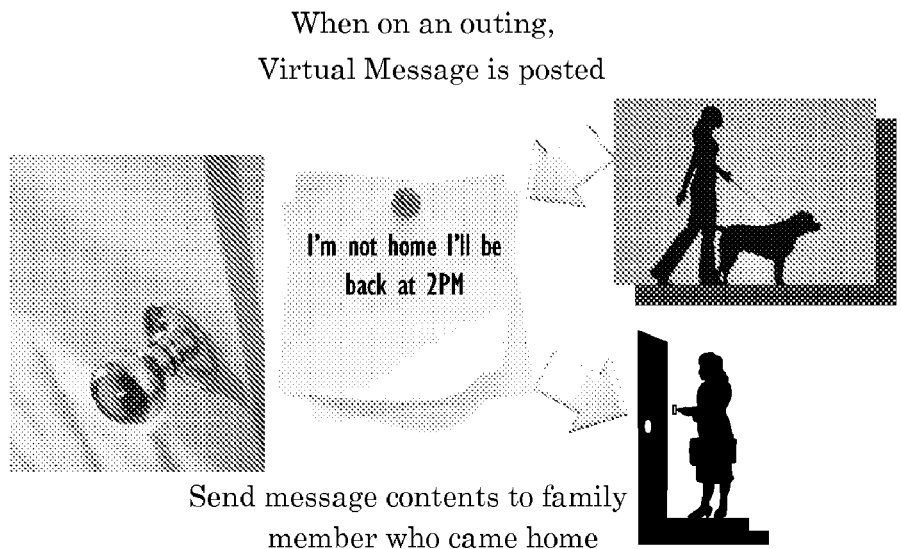
FIG. 6 is another example of use of the invention.

In another example the house door can be used to post messages, as illustrated in FIG. 6, which is self-explanatory and requires no additional description.

All the above description has been given for the purpose of illustration and is not meant to limit the invention in any way, except as defined in the claims to follow.

The invention claimed is:

1. A method for providing location-based messages, comprising the steps of:
    (a) searching among a plurality of world object for a suitable placeholder for a virtual message by using a handheld device provided with image acquisition apparatus;
    (b) selecting one of said plurality of world objects as a placeholder by filtering world objects which are not visually isolated from their surroundings and which are not planar and by applying predetermined classification tests; and
    (c) attaching one or more virtual messages to an image that identifies said selected placeholder;
    wherein the step of selecting one of said plurality of world objects as a placeholder is carried out by performing the following operations:
        (i) acquiring an image of a world object;
        (ii) pre-processing said acquired image;
        (iii) extracting image derivatives from said pre-processed image;
        (iv) determining segments within said pre-processed image of a sufficiently high image gradient that are indicative that said acquired image is visually isolated from its surroundings; and
        (v) applying validation tests to said determined segments for verifying compliance with predetermined constraints;
    wherein a region of the sufficiently high image gradient is identified by projecting gradient image content on two orthogonal axes and analyzing said projected gradient image content with respect to compliance with the predetermined classification tests.

2. The method according to claim 1, further comprising the steps of:
    (a) identifying the selected placeholder using image acquisition apparatus provided in a handheld device;
    (b) receiving one or more of the attached messages by said handheld device.

3. The method according to claim 2, wherein each of the attached messages is associated with the image that identifies the selected placeholder, said association being carried out in a computing device communicatable with the handheld device.

4. The method according to claim 3, wherein the step of receiving the one or more attached messages is carried out by communicating with the computing device, selecting one of more of the attached messages, and retrieving said one or more selected messages from the computing device.

5. The method according to claim 2, wherein the one or more attached messages is received or transmitted directly from the selected placeholder.

6. The method according to claim 5, wherein the one or more attached messages is transmittable from one mobile phone to a second mobile phone.

7. The method according to claim 1, wherein the predetermined constraints are selected from one or more of the group consisting of shape constraints, size constraints, image frame location constraints, and textural information constraints.

8. The method according to claim 1, wherein the predetermined classification tests are performed on a region of the pre-processed image and are selected from one or more of the group consisting of a repeatability test, a statistical test, and a feature content test.

9. The method according to claim 8, wherein an object planarity test is performed with respect to the pre-processed image following performance of the classification tests.

10. The method according to claim 9, wherein the object planarity test verifies whether world object points have been transformed to image points by a plane to plane projection.

11. The method according to claim 1, further comprising the step of adding an observable virtual frame around a region of the acquired image selected to be the placeholder.

12. The method according to claim 1, wherein the selected placeholder is identified by searchable location characteristics and image related information and corresponding placeholder data is stored in a database of a computing device.

13. The method according to claim 1, wherein the virtual message is a textual or visual or audio message, or a combination of two or more of them.

14. A system for managing location-based messages, comprising:
    (a) one or more handheld devices for acquiring world object images, for selecting one of said world objects as a placeholder for a virtual message, for attaching a virtual message to an image that identifies said selected placeholder, and for receiving a virtual message attached to said selected placeholder;

(b) a database in which is stored placeholder data and data related to one or more attached messages, each of said one or more attached messages being associated with a corresponding placeholder; and (c) a computing device for managing inputs and outputs of said placeholder and said message data with respect to said database and for locating and forwarding one or more of said attached messages;

wherein each of said one or more handheld devices is operable to select said placeholder by filtering world objects which are not visually isolated from their surroundings and which are not planar and by applying predetermined classification tests;

wherein selecting one of said world objects as the placeholder requires:

(i) an image of a world object;

(ii) a pre-processed image of the world object image;

(iii) image derivatives extracted from said pre-processed image;

(iv) segments within said pre-processed image having a sufficiently high image gradient that are indicative that the world object image is visually isolated from its surroundings; and (v) said segments comply with predetermined constraints as determined through applied validation tests;

wherein a region of the sufficiently high image gradient is identified by projecting gradient image content on two orthogonal axes and analyzing said projected gradient image content with respect to compliance with the predetermined classification tests.

15. The system according to claim 14, wherein each of the one or more handheld devices comprises a filtering module for defining types of placeholder worthy world objects, and a search engine for searching for and identifying one of said types of placeholder worthy world objects.

* * * * *